(12) United States Patent
Linares et al.

(10) Patent No.: US 12,407,881 B2
(45) Date of Patent: Sep. 2, 2025

(54) EVENT STREAMING WITH ADDED CONTENT AND CONTEXT

(71) Applicant: LIVECLOUDTV, LLC, Wilton, CT (US)

(72) Inventors: Bryant R. Linares, Hopkinton, MA (US); Bruce M. Likly, Wilton, CT (US)

(73) Assignee: LIVECLOUDTV, LLC, Wilton, CT (US)

( * ) Notice: Subject to any disclaimer, the term of this patent is extended or adjusted under 35 U.S.C. 154(b) by 0 days.

(21) Appl. No.: 16/141,785

(22) Filed: Sep. 25, 2018

(65) Prior Publication Data
US 2019/0104325 A1   Apr. 4, 2019

Related U.S. Application Data

(60) Provisional application No. 62/568,161, filed on Oct. 4, 2017.

(51) Int. Cl.
| | |
|---|---|
| *H04N 21/234* | (2011.01) |
| *H04N 21/2187* | (2011.01) |
| *H04N 21/236* | (2011.01) |
| *H04N 21/2365* | (2011.01) |
| *H04N 21/431* | (2011.01) |
| *H04N 21/858* | (2011.01) |

(52) U.S. Cl.
CPC ....... *H04N 21/236* (2013.01); *H04N 21/2187* (2013.01); *H04N 21/858* (2013.01); *H04N 21/8583* (2013.01)

(58) Field of Classification Search
None
See application file for complete search history.

(56) References Cited

U.S. PATENT DOCUMENTS

| | | | | |
|---|---|---|---|---|
| 2002/0059644 | A1* | 5/2002 | Andrade | H04N 21/8586 348/E7.054 |
| 2008/0129825 | A1* | 6/2008 | DeAngelis | H04N 23/661 348/E7.086 |
| 2010/0010893 | A1* | 1/2010 | Rajaraman | H04N 7/165 705/14.51 |
| 2012/0240162 | A1* | 9/2012 | Rose | H04N 21/2187 725/38 |
| 2012/0308192 | A1* | 12/2012 | Chung | H04N 21/4532 386/230 |
| 2016/0117722 | A1* | 4/2016 | Garcia | G06Q 50/10 705/14.49 |
| 2016/0191591 | A1* | 6/2016 | Rider | H04L 65/00 709/219 |
| 2017/0308925 | A1* | 10/2017 | Schneider | H04N 21/42684 |
| 2018/0014047 | A1* | 1/2018 | Ruxton | H04N 21/8586 |

(Continued)

*Primary Examiner* — Brian T Pendleton
*Assistant Examiner* — Jean D Saint Cyr
(74) *Attorney, Agent, or Firm* — SCHWEGMAN LUNDBERG & WOESSNER, P.A.

(57) ABSTRACT

A method includes receiving a video stream from a camera at an event, receiving a media asset associated with the event, wherein the media asset is interactive, combining the video stream and media asset, rendering an augmented combined video and media asset stream, and transmitting the rendered augmented combined video and media asset stream to one or more viewer devices such that the video stream and media assets are displayed on a viewer device display screen.

26 Claims, 14 Drawing Sheets

(56) References Cited

U.S. PATENT DOCUMENTS

2019/0110096 A1\* 4/2019 Shaw ............... H04N 21/25866
2019/0335133 A1\* 10/2019 Sharif-Ahmadi ...........................
                                                    H04N 5/44591

\* cited by examiner

MANAGEMENT PAGE

402 — Date d / m / y
403 — Family name:

Search Streams by: [ ] Search
[ ] Search

| Family Name | Service Type | Stream Date d / m / y | Stream Time | Stream Security Code | Distribution Link | VOD | Created | Edit | VOD Delete | Gue |
|---|---|---|---|---|---|---|---|---|---|---|
| Stream Central DO NOT DELETE | Burial/Scattering | | 1:00-PM | | http://Stream.com/tcid/TCcentral | Yes | 09-12-17 10:33 PM | Edit | VOD Delete | Gue |
| Shirley A. Likly | Burial/Scattering | 23-06-2018 | | | http://Stream.com/tcid/Shirley A. Likly | Yes | 09-28-17 2:47 PM | Edit | VOD Delete | Gue |
| Richard P. O'Neill | Funeral/Memorial | 17-02-2018 | | | http://Stream.com/tcid/4201-4658 | Yes | 02-12-18 11:05 AM | Edit | VOD Delete | Gue |
| BIZDEV Town of Wilton DO NOT DELETE | -- | 01-05-2018 | 7:30-PM | | http://Stream.com/tcid/58683662 | Yes | 05-01-18 1:31 PM | Edit | VOD Delete | Gue |
| SportsnCuse DO NOT DELETE | -- | | | | http://Stream.com/tcid/50895603 | | 05-02-18 5:31 PM | Edit | VOD Delete | Gue |
| Sir Emile | | | | | | | 05-22-18 | | | |

415 — 410 — 425 — 435 430 440

[Home]

FIG. 4

EVENT STREAMING WITH ADDED CONTENT AND CONTEXT

RELATED APPLICATION

This application claims priority to U.S. Provisional Application Ser. No. 62/568,161 (entitled Event Streaming with Added Content, filed Oct. 5, 2017) which is incorporated herein by reference.

BACKGROUND

Video streaming of events and life moments is becoming increasingly ubiquitous with the widespread availability and use of commodity streaming devices like iPhone 6, 7, 8's, higher end Android phones, digital cameras, or similar devices as may be invented in the future. Improvements in coverage and bandwidth of wireless and cellular networks allows these mobile streaming devices increasing connected access in more locations.

SUMMARY

A method includes receiving a video stream or its future derivatives (such as 3d video, or other means of capturing 'live' moments and events) a camera (or derivative device) at an event, receiving a media asset associated with the event, wherein the media asset is interactive, combining the video stream and media asset, rendering an augmented combined video and media asset stream, and transmitting the rendered augmented combined video and media asset stream to one or more viewer devices such that the video stream and media assets are displayed on a viewer device display screen.

BRIEF DESCRIPTION OF THE DRAWINGS

FIG. 4 is an example user interface illustrating a funeral home stream management page according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, mobile device, human embedded device, wearable device, or other computer system, turning such computer system into a specifically programmed machine.

A system executing software provides services that enables an individual with an ordinary cell phone, computer, enabled wearable technology, adaptive optics, multi-lens camera or other streaming device to become a Streamer/Broadcaster/Producer /Creator/Publisher to create a custom live broadcast and 'wrap the broadcast' with additional content/context/objects/media assets, to produce a personalized and targeted video/audio, AR (augmented reality), VR (virtual reality) stream referred to as a 'Life Moment'.

Figure 1A:
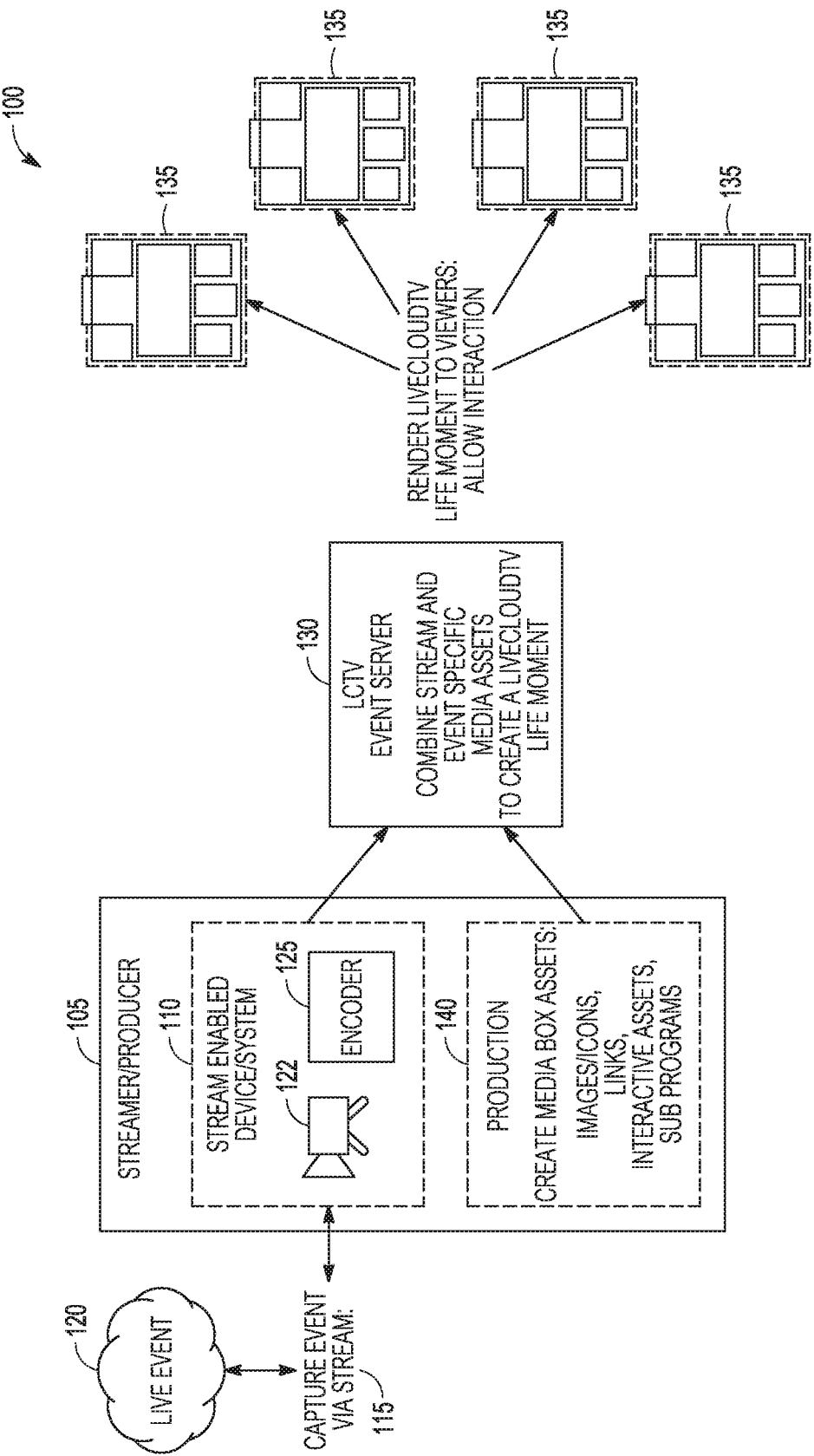
FIG. 1A is a block flow diagram of a system for live streaming events with added content and context according to an example embodiment.

FIG. 1A is a block flow diagram of a system 100 that captures life's moments more completely than a simple video stream by incorporating additional environmental queues represented by icons and subsequent content assets accessed via media boxes (context portals). The system 'Life Moments' may be subsequently saved as Video On-Demand or AR or VR On-Demand files that retain the live broadcast content and the additional media data memorializing the entire essence of the 'Life Moment'. The system 100 is a multi-dimensional media wrapping system to make unidimensional video presentations more interactive, intuitive, informative, and contextual for the viewer, even beyond being at the event or moment live. The system 100 may be referred to as a LIVECLOUDTV™ (LCTV) system.

FIG. 1A illustrates an example LCTV system 100 as including a streamer/producer 105 that includes a stream enabled device 110 or system that captures video 115 of a live event 120, such as a sporting event, wedding, birthday party, funeral, or the like. The video may be captured by a video camera 122, which may include adaptive optics, multi-lens cameras for multidimensional video capture, and other advanced video features. The captured event video is digitally encoded via an encoder 125 and provided, such as by streaming, contemporaneously with the event with only processing and communication delays, to an event server 130, or other devices or systems which might be invented in the future, and then to viewer devices 135 via active stream or stream data link. The Stream server portion of the event server 130 may be a separate server, a sub server, or part of the main event server.

Additional media or material to be wrapped with the video or video data link and presented to one or more viewers is generated by a production facility 140, which may be a cloud based, server based, or stream enabled device-based processing entity that provides event related data that may be used by event server 130 to include with the captured video to augment the video to provide an enhanced viewer experience. In one embodiment, the production facility 140 may use additional media, such as media assets (also referred to as media box assets or context portal assets), such as images, icons, links, interactive assets, and sub programs to name a few.

The event server 130 combines the received video stream/stream data link and media assets by wrapping the video stream and/or stream data link with the media assets and renders the wrapped video stream into an output referred to as a system or LIVECLOUDTV Life Moment. The event server 130 provides the output to viewers, allowing interaction with the output via the media assets and video controls, providing an augmented experience of the event to one or more viewers. Connections used to transfer data may be wireless in many embodiments, utilizing common wireless protocols and connections as well as wired connections and quantum communication methods and technologies now in existence or invented in the future.

Encoder 125: Encoders are software or hardware-based systems that include network communications capabilities and take streaming images and sounds from a camera and encodes it into a format that can then be sent to, received by, and consumed by a video server. The video server in turn processes the stream and saves and/or resends the stream to other servers which are accessed by end consumer/viewers. Examples of encoders 125 that may be used include Teradek's software based Live Air Solo and Live Air Action encoders and their VidiU and VidiU Pro hardware-based encoders. These are publicly available pieces of software and hardware that can either be downloaded from the Apple App store (software-based encoders) or purchased from a variety of retailers (hardware-based encoders). Live Air Solo and Live Air Action, when launched from an iPhone or iPad launches a software application that allows the user to capture and stream a live event using that device's built in camera, almost instantly process the stream and send it over a cellular, wired or wireless network to a video server end point (usually defined by a URL that the user enters into the application at setup) using that device's networking capabilities. VidiU and VidiU Pro are deck-of-card-sized pieces of hardware that have encoding software and networking capabilities built into them but require external attachment of a camera (in many cases any camera with an HDMI output port can be used).

The event server 130 packages all of the elements that the producer 105 has captured and defined and renders them into interactive web pages that the end consumer/viewer can then view and experience. The elements that are combined in the event server 130 are those that the producer 105 has defined by setting up a stream event. The elements include but are not limited to the streaming video 115 (or saved video) and its source information. Further elements include the media boxes/context portals and the contained layers of information, data, and instructions they contain and theme related items on the page and in the media boxes/context portals such as precursor images, backgrounds, sounds music, text, geographic and spatial data, program instructions or introduction videos. Other elements include information that set the 'tone' and context for the viewer.

Context portal and Theme/Background assets are added to the video Stream when the producer 105 sets-up the stream, ie before the event happens. For example, a producer 105 may set-up the upcoming stream by recording its time and place in a production section of the event server 130 and requisition streaming Services for the event stream. The Producer may also add the background elements that provide the setting for the live event to be streamed, such as background images, music, Descriptive text, instructions and pictures. These media assets can also be added to, updated and/or edited further before, during or after the video stream is initiated.

Finally, the producer 105 may add information for each context box including but not limited to icon/images, text, format, size, color, code/instructions, geo/spatial data and additional asset layers for the context box including similar types of information and data. The producer 105 may rely on a template of pre-saved context box elements or create them each from scratch. Alternatively context box elements may be added by the viewer/users in some cases if the viewing experience is setup to be interactive.

Chat, comments, and viewer provided images/videos are simple examples of viewer added assets that may be added before the event but increasingly will be added during a live event as live events become more interactive. Live, interactive 'voice chat' with 360-degree video imaging (to simulate an interpersonal conversation at a live event) in one of the asset boxes is another example.

Figure 1B:
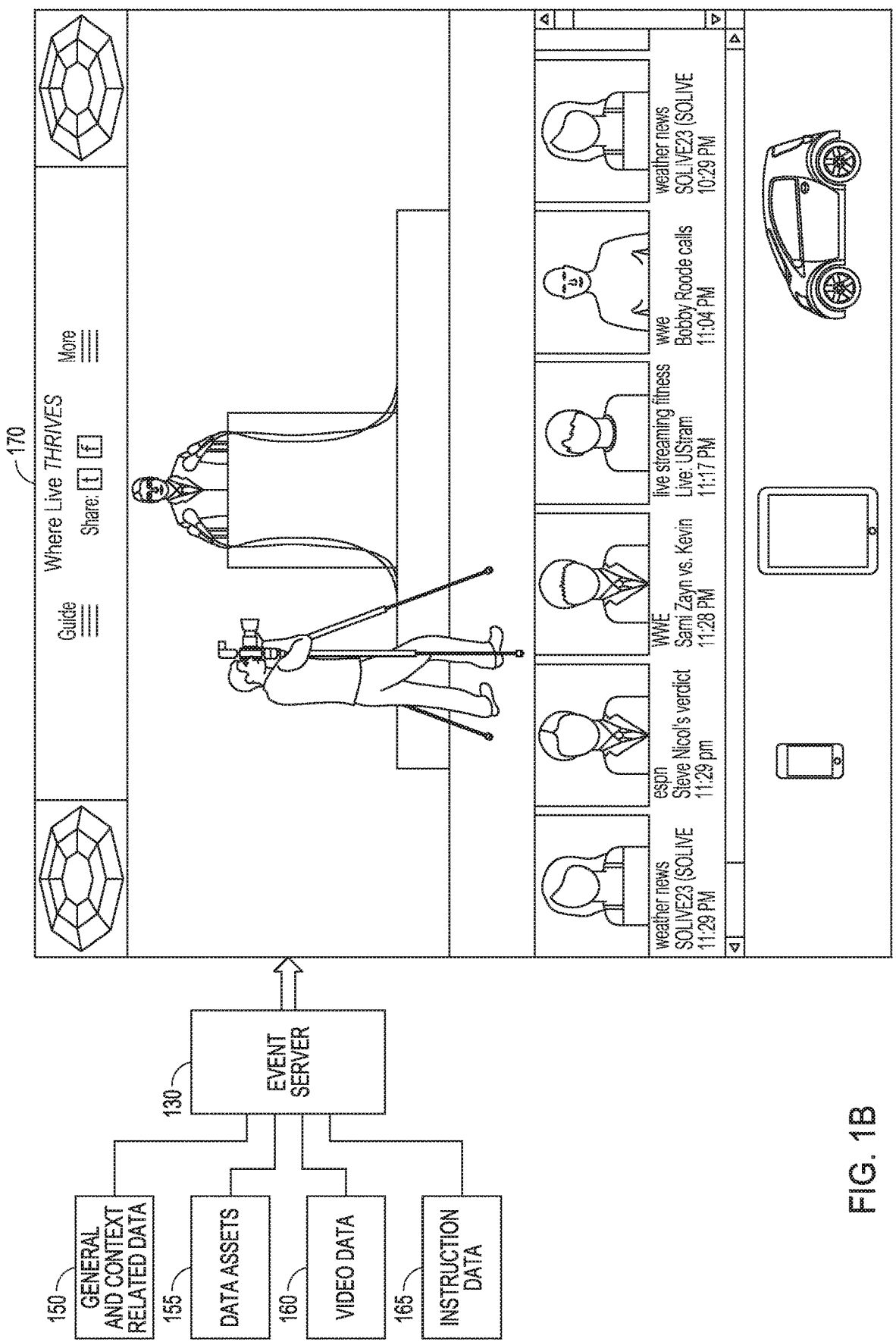
FIG. 1B is a block diagram illustrating a data stream before and after render according to an example embodiment.

FIG. 1B is a block diagram illustrating a data stream before and after rendering. Prior to rendering, several forms of data are provided to event server 130. At block 150, general and context related data and pointers to stored data may be provided. In one embodiment, block 150 represents data selected by the producer 105 and may include context portal text, color, theme, instruction/code, location, size etc. Background and screen data text, color, theme, instruction/code, location, size, and other attributes may also be provided. Further data includes main event display area text, color, theme, instruction/code, size, and other attributes. Still further data may include one or more of permissions, layers, links, enabled applications, and other information for the data in block 150, which may be stored on computer readable media.

A block 155 may include one or more of image/icon/hologram/etc. data assets and pointers to assets. Images, pointers to images, image related data including size, actions, instructions, locations, thumbnails, and other data may be included. For such data, may include information specifying various locations and layers where images, icons, holograms, and other data should be displayed.

A block 160 may include one or more of video/holo/VR/AR data and pointers to data. Stream source information, links, instructions, actions and data for streaming, recording, and storing of the event may be included.

A block 165 may include format and other instruction data, such as HTML, CSS, JavaScript, Ruby, PHP, and other program language or scripting instructions to format, instruct, direct the rendering, construction, action and/or interaction, of pages and server assets before, during, or after construction.

The above data is received by the event server 130, which combines the data and renders all pre-render elements according to programming instructions as set up by servers, programs and producer and/or user instructions.

A post render representation is illustrated at 170, as may be seen by a viewer on one or more viewer devices 135.

Viewing of rendered streams and events can be done using commodity browsers or their future iterations such as Chrome, Firefox, Internet Explorer, etc., running on the viewer devices 135. The browsers would generally be enabled with html, html5, JavaScript, CSS and other current and future browser side language capabilities that would allow them to interact with the servers and programs providing the stream/asset box package and programs. Alternative viewing 'browsers' might also be used via custom applications written specifically for Android, iPhone or other remote viewing devices. This may include holographic viewing, VR headset viewing, and in situ viewing with for example implants and devices such as artificial 'eyes' or direct to brain/nerve/body sense implants or systems. Other permutations may include group viewing, and forms of projected and interconnected group viewing where more than one persons or entities view and interact with the same stream, images, context information, etc. Entities may include but aren't limited to humans, animals, machines, computers, artificially intelligent entities and other human and non-human entities. Viewing and the underlying viewed assets may be in a variety of forms including 2d, 3d, holographic and other future forms that allow the end user to experience the event in as close-to or in an augmented manner of its live form.

Figure 2:
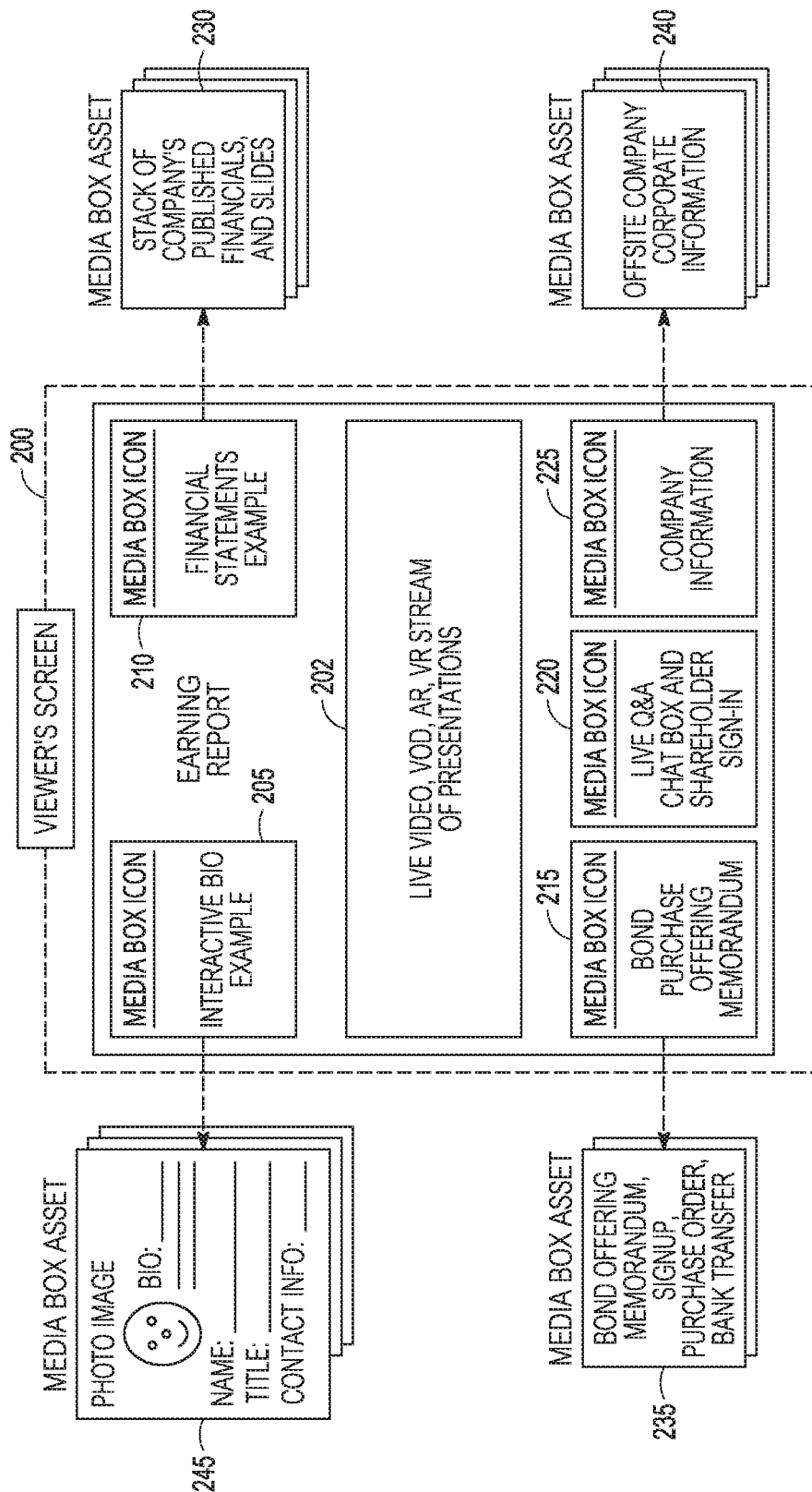
FIG. 2 is an example system in the process of live streaming an earnings report presentation.

Viewer device 135 in one embodiment may display the streamed video/AR/VR/etc., in a center portion 202 of a viewer device display screen 200 as shown in FIG. 2. Media assets in the form of box assets or icons 205, 210, 215, 220, and 225 are displayed in one or more asset display portions (five are shown in this example embodiment) of the screen disposed or wrapped around the center portion 202 of the screen. Directly related content that provides the viewer with better context may be referred to as context boxes or a context portal, such as box icon 210 linking a stack of the companies published financials and slides as indicated 230. When the link is selected, content from the stack may be displayed within the box icon 210 with a navigation button to return. Boxes may have multiple links and may also include real-time information, such as stock prices, sport scores, etc. Boxes may also have advertisements or other non-related content.

Box icon 215 in one embodiment links to one or more media assets including a bond offering memorandum, signup, purchase order, bank transfer and other information at 235. Box icon 220 may include a live question and answer chat box and shareholder sign-in functions. Box icon 225 may include a link to company information provided by other websites or providers as indicated at 240. While the position of icons may be specified by the event server 130 rendering, viewers may be provided the ability to change and personalize positions, sizes and other attributes in further embodiments.

In further embodiments, the media/context portal asset icon boxes may be displayed within the center portion and may be displayed in a position corresponding to content in the video with which the media asset is associated. For instance, if a person appeared in the video, the media asset box/context portal 205 may have a link to the person's resume or social media account (represented at 245) may be positioned near the person. The person may be recognized by image recognition components of the event server, or even identified by a person operating the video stream enabled device in various embodiments with the identified person tracked by object tracking software executing on the event server or elsewhere, such as the viewer device or video stream enabled device.

Box icon 205 may have event server 130 associated functionality to automatically switch the link to a new current speaker base on image and/or voice recognition, or other means of identifying the speaker, such as a communication connection or user id associated with a video feed. Box asset 245 may include information for multiple speakers that is assembled prior to the event, or may dynamically find resumes, social media accounts, and other information based on the identification of the speaker.

A digital file for the system Life Moment may be stored and streamed in any combination of the following formats, encompassed by the term video:

Video/audio (and their various formats—MPEG, MOV, etc.)

2d, 3d, holographic type Video/audio; Augmented reality (AR) (video with augmented reality overlay); and/or Artificial Reality or virtual reality (VR) environment.

In some embodiments, the system 100 may be used to promote or enhance an already captured event. In further embodiments, for example, a movie producer may use the system 100 to push up a trailer for the movie, with the media assets including information related to the movie, like actor bios, websites, Twitter accounts, and other social media channels, where the movie was filmed, director and producer information, where playing, a related documentary, etc.

Additional media comprising the system Life Moment may include photos, order forms, photo gallery, product information, sign-in pages, comment pages, Company information, chat window, geo location related assets, etc. Additional media that fills out the system Life Moment may be interactive or static and may include updating information within media boxes. The additional surrounding media assets 205-225 may consist of a number of elements including one or more of a Media Box Image or a Media. Box Icon that shows on the main viewing page or a link to a media box asset.

A media box/context portal image/icon may be producer and/or user defined in that it can be an image, video, graphic, picture, icon or other live content either related or unrelated to the event or viewer interests, and may also be 2d, 3d or VR. The media box/context portal may also be used to capture other interactions, such as machine to machine interactions, sight, sound, smell, and other senses. For example, when a user accesses a media box/context box it could initiate an instruction to a commercially available scent machine that then discharges a specific and potentially directly related scent. An example might be a live cooking show surrounded by related content about where the ingredients for a specific recipe come from, where to purchase the ingredients, how to prepare the ingredients and connection to a scent machine that shares how the finished recipe might smell. One example scent machine includes an Ambius Premium Scenting (www.ambius.com/scenting/scent-machines/). The media box/context portal may also be used to interact with embedded technology that may include machine/human embedded devices, and other embedded devices with human or non-human interactions.

Additional media may be clicked-on, hovered-over, poked, grabbed, etc., to drill down to additional information, activate a sub program, access a database, link to an external asset, or access an image gallery for example or communicate with an outside or inside system or sub-system.

The additional media may be placed surrounding the stream content, overlaying the stream content at the edges, floating as an icon, or in user defined or selected areas in and around the 'stream event'. A large variety of image and video capture devices may be used, such as 35 mm (other sizes) cameras, digital cameras, video cameras, multiple numbers of video cameras for 3D video and holography, 'cameras' utilizing varying wavelengths or sensors that capture 'images' and data outside of the normal human optical or audio ranges, as well as associated audio capture devices and other devices that capture or infer visual or audio information and non visual or audio information. Such device may be used for additional media as well as the event video capture.

The additional media or content and page may be interactively toggled on or off, minimized, maximized, brought up in a separate viewing tab, interacted with or bookmarked or saved for later integration using a variety of currently available user interfaces such as mouse type controls, touch screen type controls, VR style type controls and voice, electrical, limbic, muscle, chemical, optical, gesture, thought, sonic, indirect and direct, olfactory, or brain activity type commands but will also be possible via sight controls, body movements and implantable devices and other interfaces as they become available.

Context box asset features and actions can be enabled/disabled and controlled by the producer and further controlled by the end viewer. At the time of set-up for the event's streaming the producer configures each context box asset to determine its behavior, look and feel. These configurations may include, size, text, colorations, location, placement, actions such as rotation, cycling, dimension, etc. Further the set-up also may include enabling or disabling context box attributes that may be accessed and changed by the end viewer/user. For instance, the context box may be enabled to allow the end viewer/user to move the actual location of the context box on the screen, or change the theme of the context box, or change its rotation in and out of the screens viewing area.

The media box or context portal asset may include, other images or icons, a link or links to a secondary URL, programs, sub applications, a separate application, program or database, or live interactive information and data that changes as a function of what the streaming content is pushing up. For example, the stream may be pushing up an Earnings Report by a Fortune 500 Company, and one of the context portal assets is actively pushing up information/bio about the speaker who is currently talking in the stream [based upon their facial recognition, and subsequent link to a database on that identified individual]).

In one embodiment, the media box/context portal assets may reside as pail of a system Life Moment platform or may be separate and independent. Media box assets may be thought of as context portals to better describe their purpose. When media box assets are providing context to a viewer they are a context portal capable of taking the viewer to new levels of understanding, experience, and interaction. When they are media boxes they may be advertising or less related to the live stream but never-the-less enable the same level of user interaction, depth and context as the context boxes themselves. In a remote medical diagnostic application use case example the media box/context portal assets may be sensor information from any number of imbedded or local sensors for the patient being interviewed by a remote doctor(s) with the pure media boxes popping up ads and information for suggested drug/therapy options from participating pharma/drug companies.

Streaming of events and life moments are becoming increasingly ubiquitous with the widespread availability and use of commodity streaming devices like iPhone 6, 7, 8's and higher end Android phones and other fixed, portable, wearable, implantable devices which may be invented or developed in the present or future. Improvements in coverage and bandwidth of wired, wireless, cellular, quantum and other communication networks allows these mobile streaming devices connected access in more locations.

Prior live streaming and video-on-demand (VOD, content that was previously live and is now recorded) transmissions are one dimensional representations of real life events and moments which lack the context, feel and interaction of the real-life event.

LCTV Life Moments put these unidimensional videos into context by surrounding the 'Stream Event' with relevant information integration that brings the viewer closer in all ways to the live event even though they cannot be there in person.

With the additional media, some may simply prefer to observe the event in a richer environment than is possible by attending in person, or may wish to augment their in-person attendance by also viewing the streamed life moment with the additional media/context via a smart phone or even digital glasses.

In one example of the present system as illustrated in FIG. 2, viewers (those viewing the live multidimensional media stream) such as financial institutions can not only view the earnings report video 202 but they can also participate by signing-in, asking questions via box 220, reviewing the attached financials via box 210 and linked media 230, and participate in a private bond offering via box 215 and linked media 235 that is only being offered to attending analysts, shareholders, and financial institutions. This is normally not possible without being at the actual event.

In FIG. 2, the media being streamed to the viewer device causes a display of the media stream for display on the viewer's screen 200 of live media in the central window 202, with media boxes/context portals 205-225 being displayed around the central window 202. Icons 205-225 can be as example pictures, images, holograms, 3d representations, VR assets, etc. Note that the central window 202 may display live video, video on demand (VOD) augmented reality (AR), or virtual reality (VR) streams in a variety of formats of the event, such as an earnings report presentation. The relative position, size and functionality of each of these boxes can be manipulated via the event server 130 or by a browser in a user device.

The media box/context portal icons 205-225 in one embodiment may be selected to cause display of a separate window or display area containing multiple images, articles, bond offerings, memorandum, purchase orders, bank transfers, offsite company corporate information, stack of company published financials and slideshow, etc. This content could be presented in scaled down format within the context box, with the scaling being provided by the system or the producer 105, or the content could be a representative image that suggests to the viewer what is accessible by interacting with that box.

The separate windows/boxes/portals may be stacked for each type of related asset to be displayed. Access to the various layers of boxes in a stack may be controlled by the producer 105 based on time or viewer interaction with the box or other boxes. The method of returning to the top of a stack of boxes may also be controlled by either the producer 105 or the viewer based on time or user inputs. Also shown in FIG. 2 is a live chat box 220, allowing viewers to post comments, messages or communications of varying formats in the box icon 220, or in a separate window or display area, such as a floating pop-up dialog box for chatting.

Alternatively, the action (such as a sub video, order form, image, or other form of content) may be contained within the context box itself. The duration of the action and its attributes would have been setup by the producer at the time the event was setup and sometimes may be modified by the user, external input or by the system itself. A setup example would be that clicking on a context box icon launches a short sub-video in the context box which returns the viewer to the original context box icon when it ends or when the user clicks on the context box again. A navigation element may also be present in the context box that would allow the expansion of the context box size to accommodate sub-elements of varying sizes and additional navigation tools to allow the drilling down and returning back up through a context box layer stack.

In various embodiments, the event may include remote medical or situation diagnosis, business communications, education, news coverage, such as coverage of political rallies, protests, parades and so forth, as well as human events like weddings, funerals, baptisms, local sports or any other event that might be of interest to a potential viewer.

Figure 3:
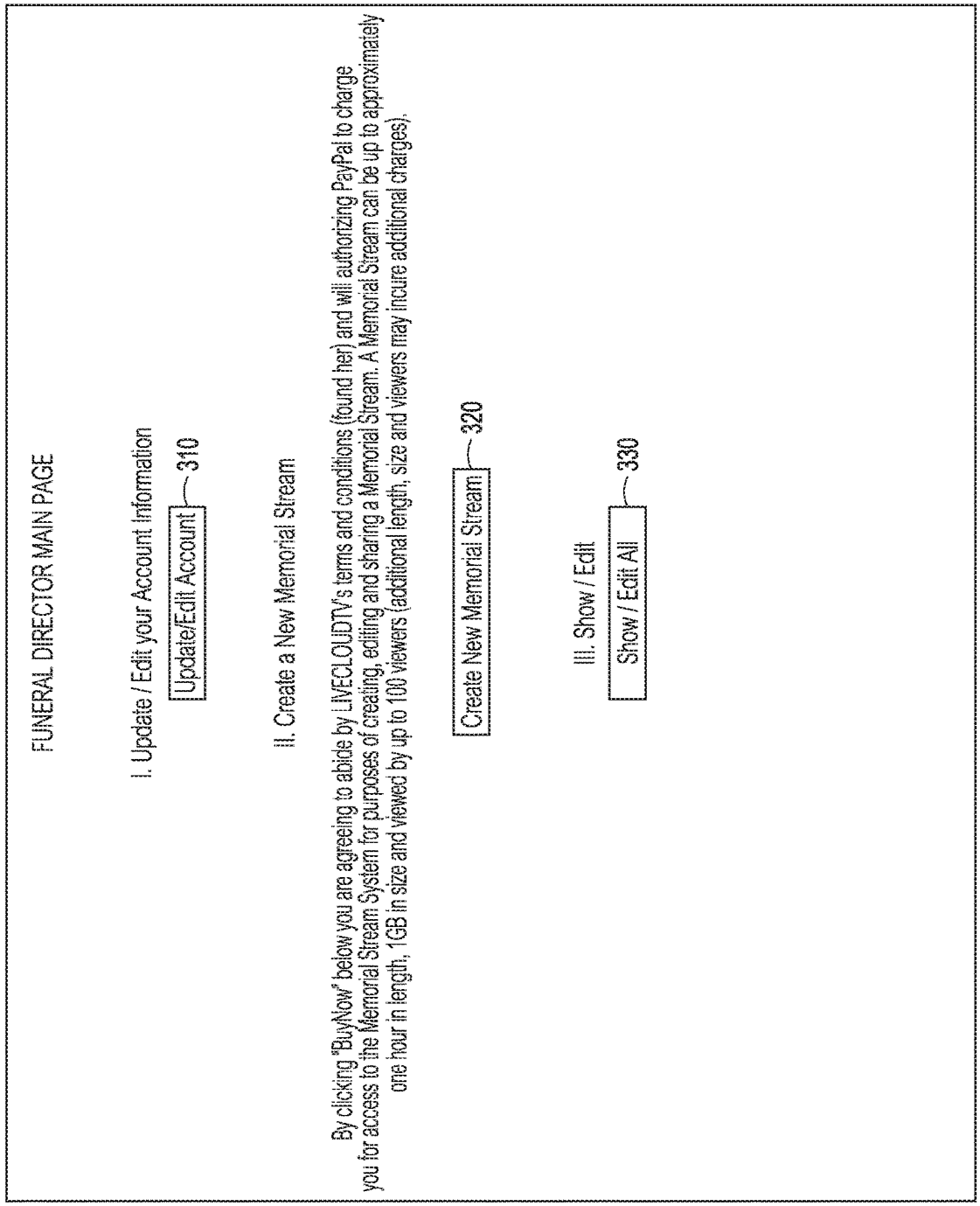
FIG. 3 is an example user interface illustrating a main page for a funeral home director to manage creation of one or more memorial streams according to an example embodiment.
Figure 5:
FIG. 5 is an example user interface illustrating a memorial editing page for a funeral director according to an example embodiment.

In one embodiment, the system may be used for streaming funerals. A funeral director may have an account to use for organizing funerals. A web browser type page 300 is shown in FIG. 3 which facilitates editing of account information 310 for the funeral director, creating a new memorial stream at 320, and showing all memorial streams at 330. A mobile app can be used in similar fashion, with pages broken into multiple pages to account for a smaller screen size.

Selection of all memorial streams cause the system to search for such streams and provide a list 400 as shown in FIG. 4. The list 400 includes a status, such as status 410 for future streams, a family name 415 for ease of reference in identifying memorials, an address 420 for the stream, a distribution link 425 for forwarding to potential viewers, a video on demand field for indicating whether a past stream is available to view on demand, and a created date for when the event to be streamed was first set up. Interactive links are also provided to make an event available via VOD 430, edit the list 435, and to delete 440 or destroy the stream.

Selection of editing a stream for an event results in a screen 500, such as that shown in FIG, 5 to edit the memorials. Space is provided to include a link to present information 510. 515, 520, 530, 540 in each of the five asset display portions. Links to pictures, social media accounts, obituaries, videos of the deceased, or any other media a family or funeral director may want to display with the streaming media may be provided. Drag and drop functionality may be provided from browse selection boxes 545. The top central asset display portion, or other portion, may be used to add a link to the funeral home at 550. Note also, that a description of the event, referred to as a stream message may also be included via text entry at 555, and be displayed in the center portion of the viewer display at least before the event.

Figure 6:
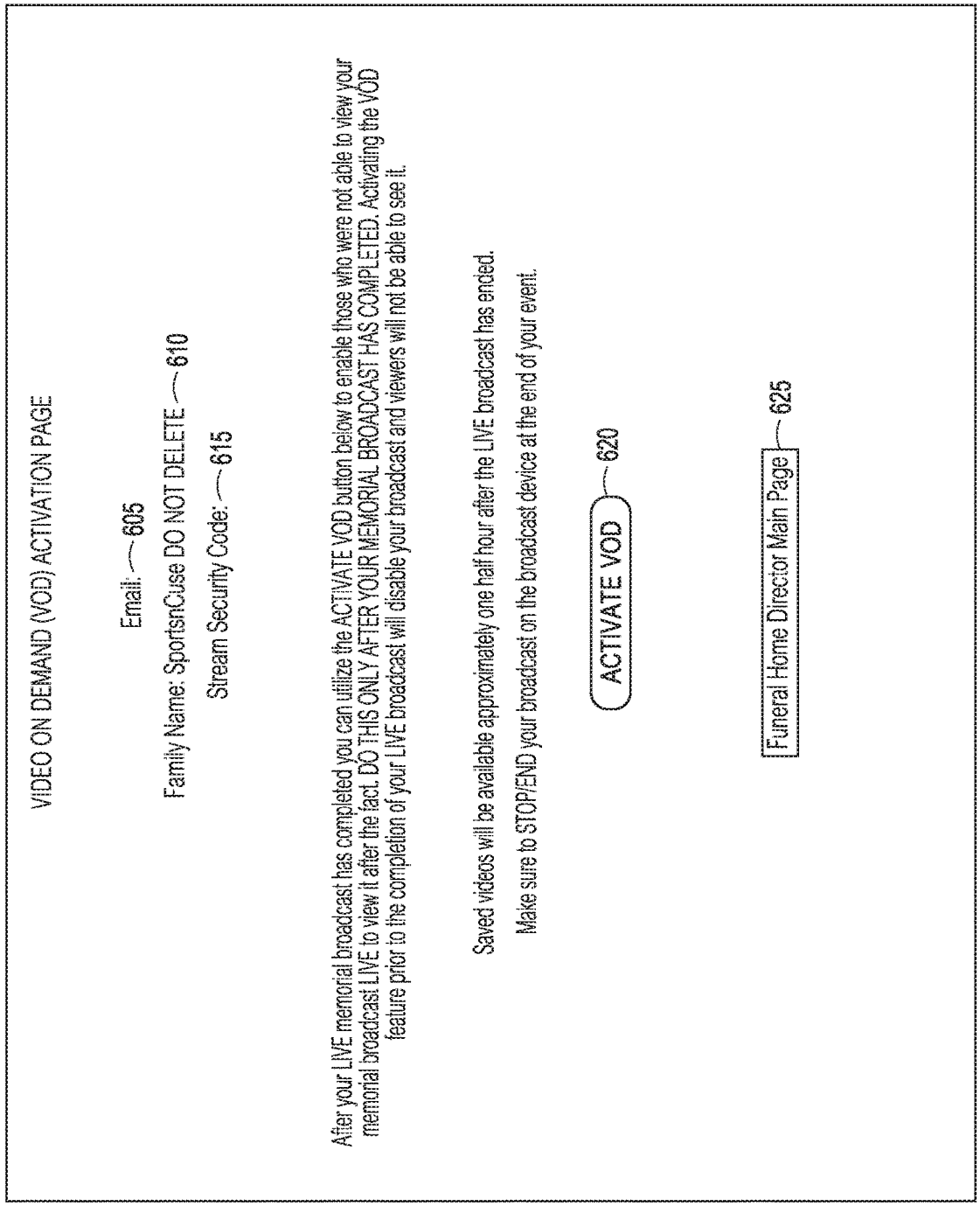
FIG. 6 is an example user interface illustrating a video on demand function for making an already live streamed event available for viewing on demand according to an example embodiment.

FIG. 6 is a VOD screen 600 arrived at from selecting a VOD link 430 in the list of existing streams shown in FIG. 4. The VOD screen 600 includes information about the screen such as the family name 610, status 615, encoder stream name 620, stream ID 625, and VOD stream uniform resource locator (URL) 630, allowing a user to select to make an already live streamed event available for viewing on demand.

Figure 7:
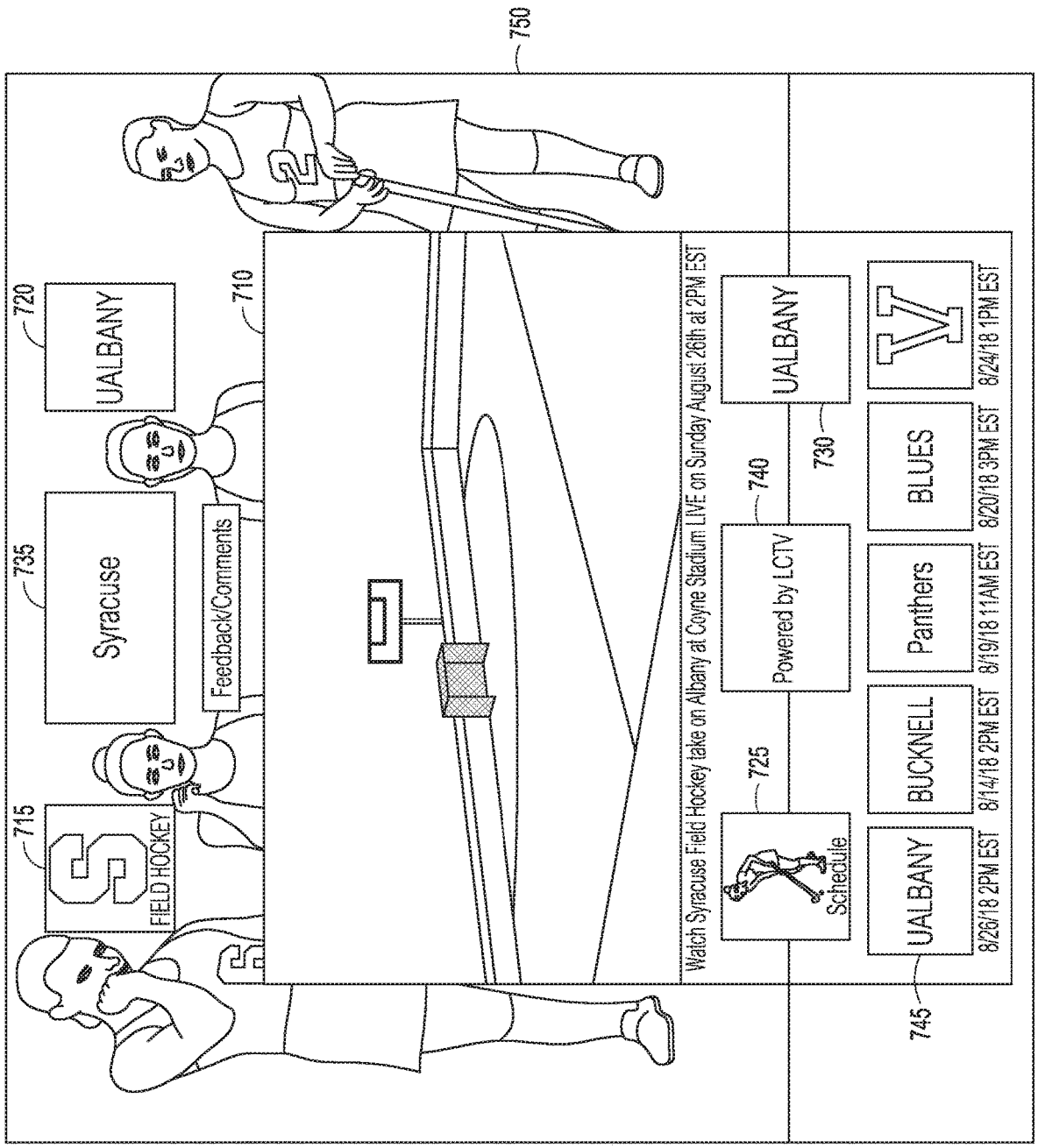
FIG. 7 is an example user interface for viewing an event to be live streamed according to an example embodiment.

FIG. 7 is a screen 700 showing a viewing screen that has been set up for a field hockey game yet to be played between two college teams. The central portion of the screen 710 will contain video of the game when being played, or later via VOD following the game. Team rosters and team schedules may be shown via media/context assets 715, 720, 725, 730. An image of the home team school 735 is shown in this example, as well as an advertisement 740 for the service that makes such a multi-dimensional media wrapped streamed event possible. Note that these are just example media/context assets that may be displayed. Advertising may also be included in one or more media/context asset display areas. A 'ticker' 745 enables viewer access to the current game on the left (UALBANY) along with other previously streamed and saved game files (BUCKNELL, Panthers, etc.) that the user can scroll through and view when clicked on.

Streamers/Broadcasters/Producers may be designated as either 'single event' broadcasters or "channels". When a Streamer/Broadcaster/Producer is designated as a channel the system 100 enables them to include thumbnails and links to previously recorded live events. The system 100 also enables them to vary the media/context box content and the screen background with each broadcast. In further embodiments, the system 100 enables a broadcaster to change viewers' backgrounds, themes and other page assets to further enhance context.

Links to future, currently streaming events, and past event VOD may be provided via electronic and print communications to distribution lists and may be searchable via search engines looking for events. Currently streaming events may also be identified and prioritized by search engines in some embodiments, such as for sporting events. In some embodiments, the service may be provided as a subscription service for viewers for a fee. In other embodiments, organizations producing the stream may pay a fee per event or per viewer or otherwise to allow any viewer to view the stream. This may be more applicable to a funeral home, where the number of viewers is likely small and likely not to have subscribed individually. For larger events, like sporting events, advertising may pay for service, or a pay per view or paid up subscription by viewers may be used. Many different models for access control may be used in various embodiments. Media boxes may be purchased directly by advertisers or via auction, with multiple advertisers competing for one or more media boxes for an event or series or group of events.

In further embodiments, the media assets may be set up to show reduced bit rate or full rate videos of one or more other cameras capturing the event in different formats such as 2D, 3D, AR, VR, etc. Such media assets may be selected by a viewer to switch places with the video currently displayed in the central portion of the screen, allowing the viewer to select different views of the video as desired, in effect becoming the producer of their own experience. The selection of a different view may be communicated back to the event server, which renders the different view of the central portion and the media assets responsive to the selection. In still further embodiments, the video captured by two different cameras may be viewed together, side by side. In still further embodiments, video from two or more perspectives may be stitched together to form a three dimensional or virtual reality experience for the user.

In one embodiment, the different views may be stacked as a link from one of the media asset display areas or may be placed in several side by side media asset display areas arranged sequentially, such as clockwise, based on the current view displayed in the central portion of the viewer screen. In a further embodiment, the views available may be shown on a map of the event environment. The map may show the camera location with or without the content from the camera being displayed. Selecting the camera location by the viewer results in content from that camera being displayed.

In one example, a soccer game may be dedicated to a player with a particular medical condition. The player may be featured in a media asset display area, which may also provide information on the condition and perhaps a fund-raising page for research or to help with payment of medical bills.

Figure 8:
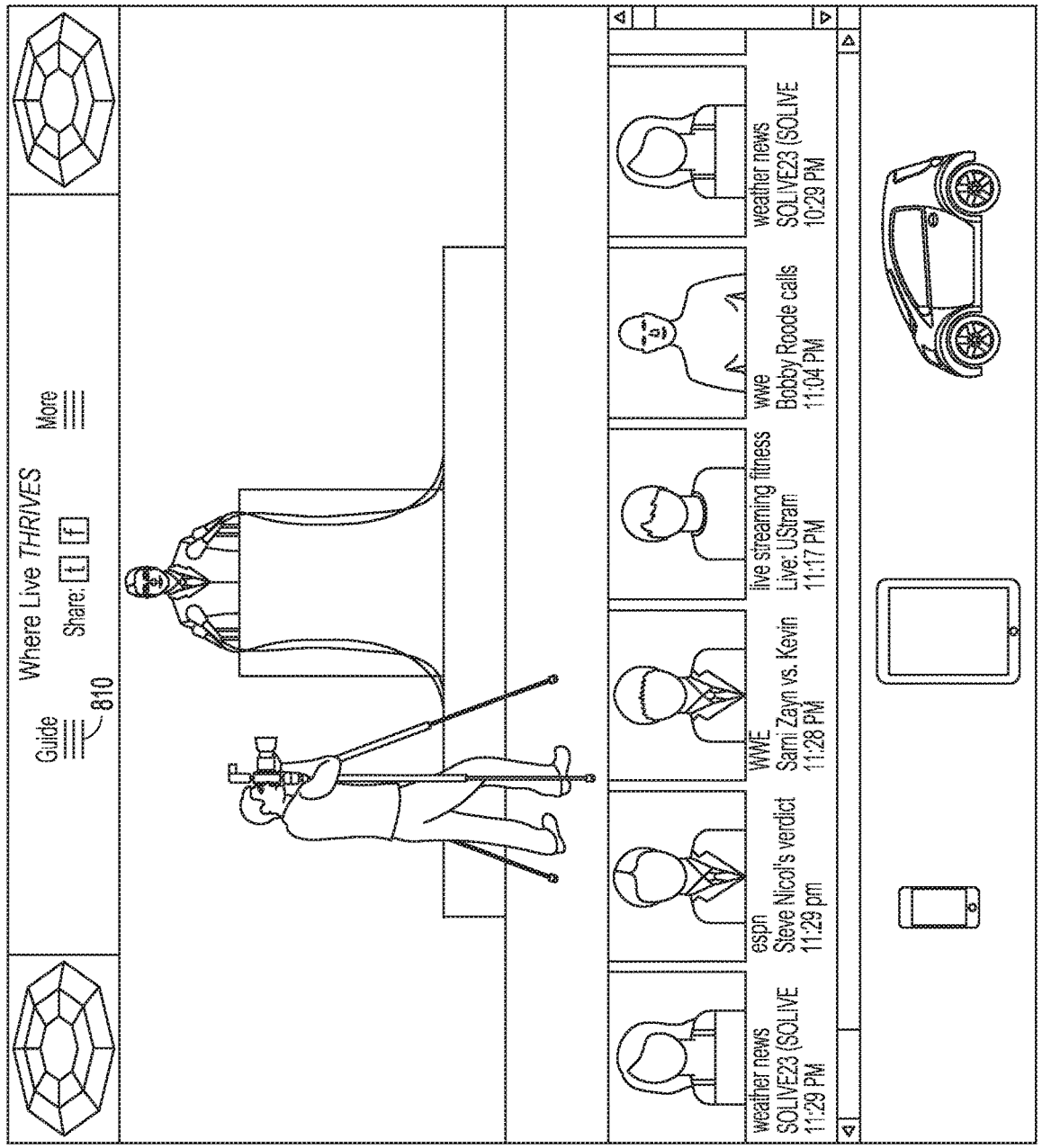
FIG. 8 is a screen shot example of a user interface for experiencing a live streamed event that includes video, content, and context according to an example embodiment.

FIG. 8 is a screen shot 800 of an example user experience generated by the system. Clicking on the guide three bar icon 810 causes display of a guide (not shown in this Figure) that may include search fields, a live button and a nested menu seen on the left side of the main viewing portion of the screen. Clicking on it again removes the display of the guide.

Note that the lower media box in this example may be scrolled to view further available streams. The main viewing portion shown is that of an example graduation ceremony service. In one embodiment, advertising may appear in one or more media boxes as shown in the upper left and right media boxes with elevated fire pits for sale. Selecting such media boxes may lead to a site, opened in a new window for example, where the fire pits may be purchased. Further ads may appear in additional media boxes below the current live available streams.

Figure 9:
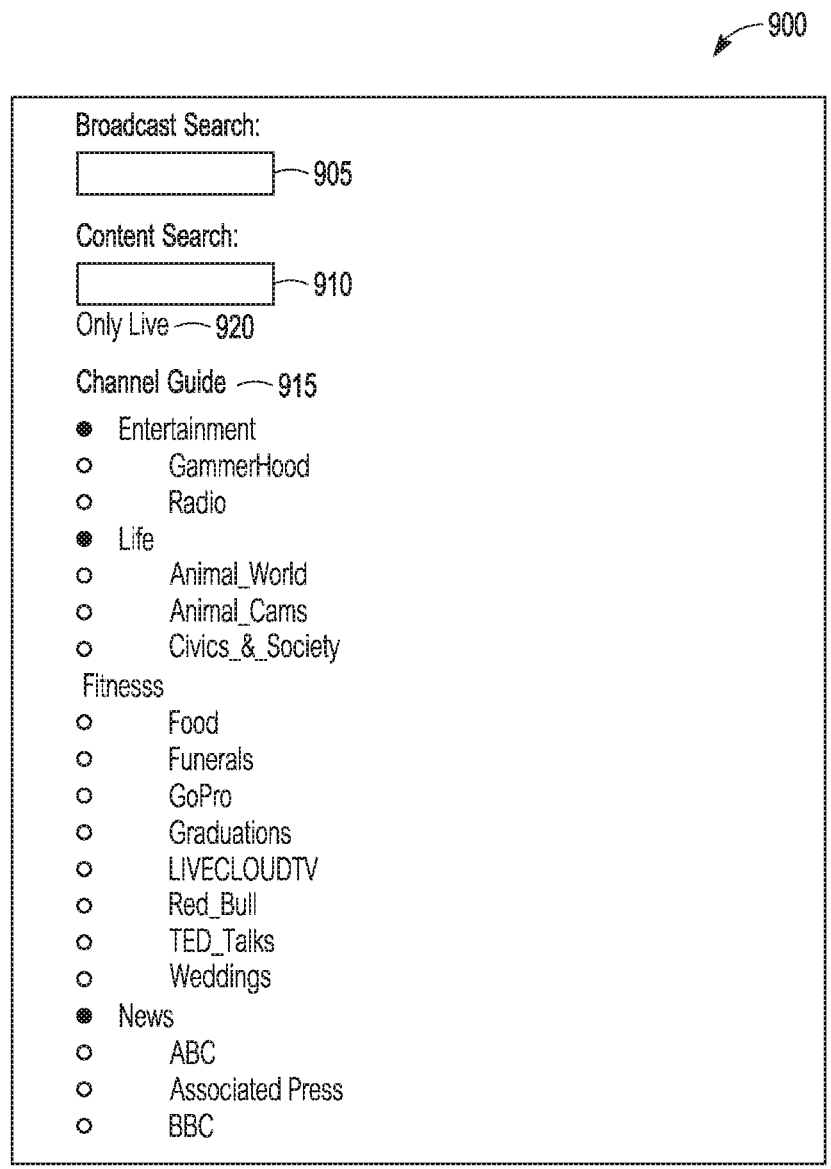
FIG. 9 is an example of a user interface providing a streaming guide and search function, integrating streams from multiple sources according to an example embodiment.

FIG. 9 is a representation of a guide 900 and an expansion of the nested menu of the guide includes a Broadcaster Search text box 90.5 with a content search box 910. A channel guide 915 may include many channels and a 'drill down' function to get to highly granular and specific topics at the bottom of the 'drill down'. For instance 'Live Sports' may be the top channels but a full 'drill down' may get to a specific layer 'Live Small College Quidditch Game' and 'Live Small College Quidditch Strategy Presentation'. The channel guide 915 is shown truncated in FIG. 9, but may include the following channels organized in general categories such as entertainment, life, news, etc., which may be only live video streams in one embodiment:

Channel Guide
Entertainment
GamerHood
Radio
Life
Animal_World
Animal_Cams
Civics_&_Society
Fitness
Food
Funerals
GoPro
Graduations
LIVECLOUDTV
Red_Bull
TED_Talks
Weddings
News
ABC
Associated_Press
BBC
Bloomberg
C-span
CBC
CBS
CGTN
CNN
Fox
Golden_State
NBC
Other_News
PBS
Ruptly
TVC News
USA_Today
Washington_Post
White_House
Other
Sports
Collegiate
Fishing
High_School
Connecticut
HAN_Network
Motor_Sports
Professional
X_Games
Travel
Weather The Pulse of Your LIVE World!

The guide provides text boxes for searching for broadcast channels at 905 or content at 910. An "Only Live" button 920, when selected, displays icons in a lower media available display portion of current live streams that are available, as shown in FIG. 9.

Figure 10:
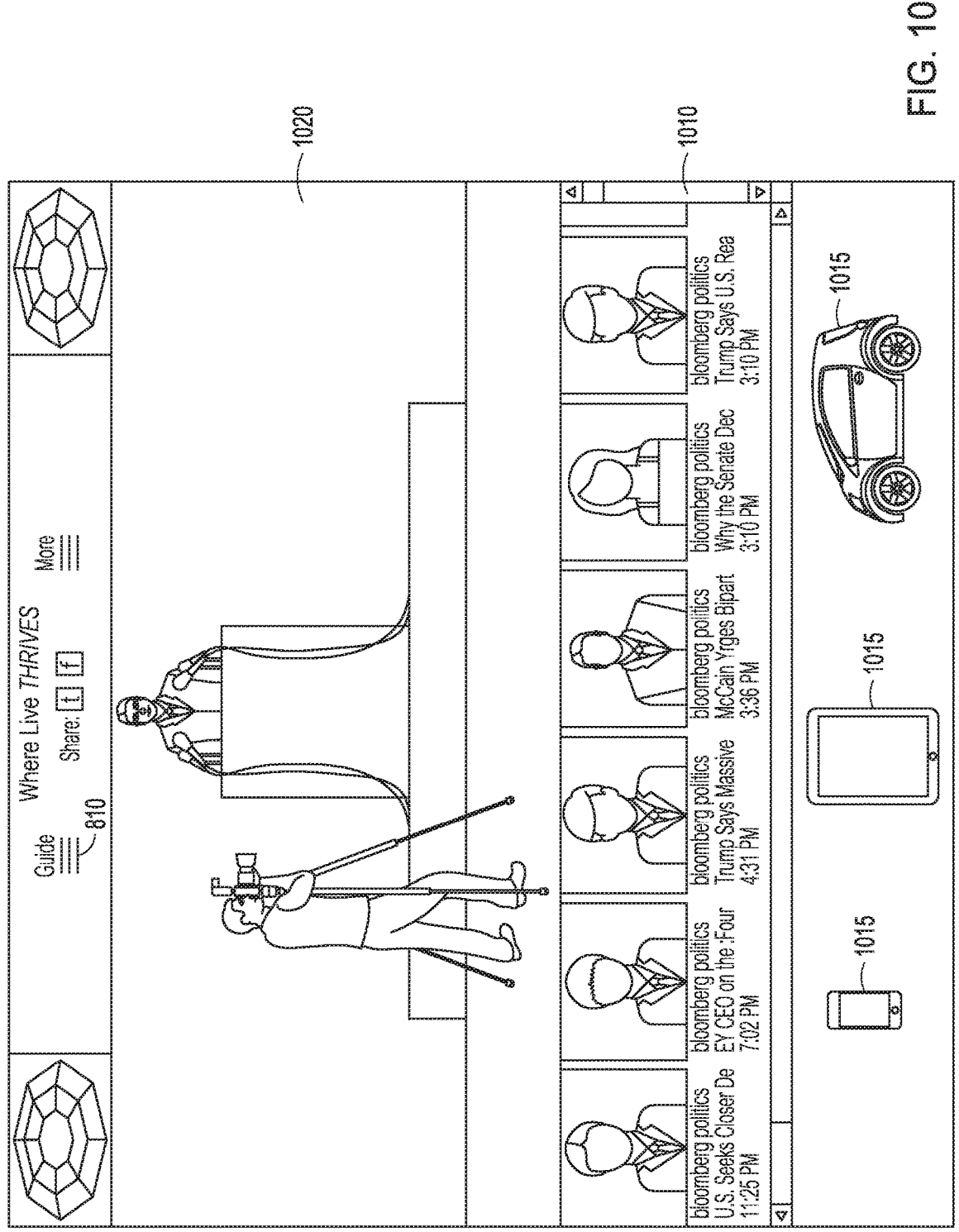
FIG. 10 is an example user live stream interface based on a keyword search "trump" according to an example embodiment.

An example of available streams resulting from entering "Bloomberg" in the content search field 910 is shown in FIG. 10 at 1000. Streams from the Bloomberg network may then be shown. Additional controls and links may be provided to navigate back to screen 900, such as are common in web browsers. A series of current and future media streams are shown as icons or selectable links at 1010, and advertisements may be shown at 1015. The selectable links 1010 may include reduced versions of streaming video for live streams in some embodiments, which when selected, are placed in a main viewing area 1020. Note that the links 1010 are essentially a list of streams resulting from executing a search on the term or terms entered in the search field 910. The main viewing area 1020 will initially display a live stream of a highest-ranking item from the search.

Figure 11:
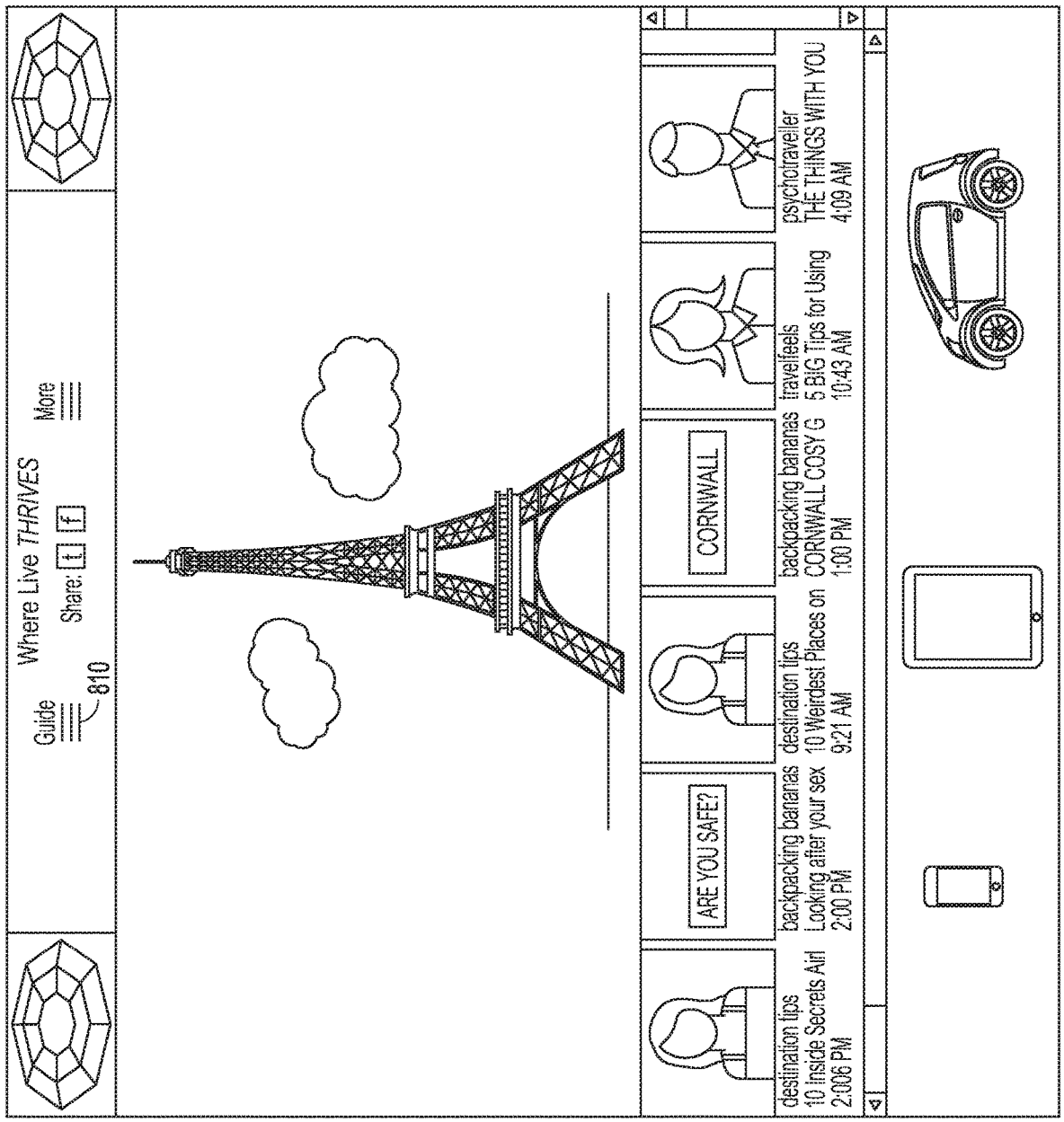
FIG. 11 is an example user live stream interface based on selecting a top-level menu word "travel" according to an example embodiment.
Figure 12:
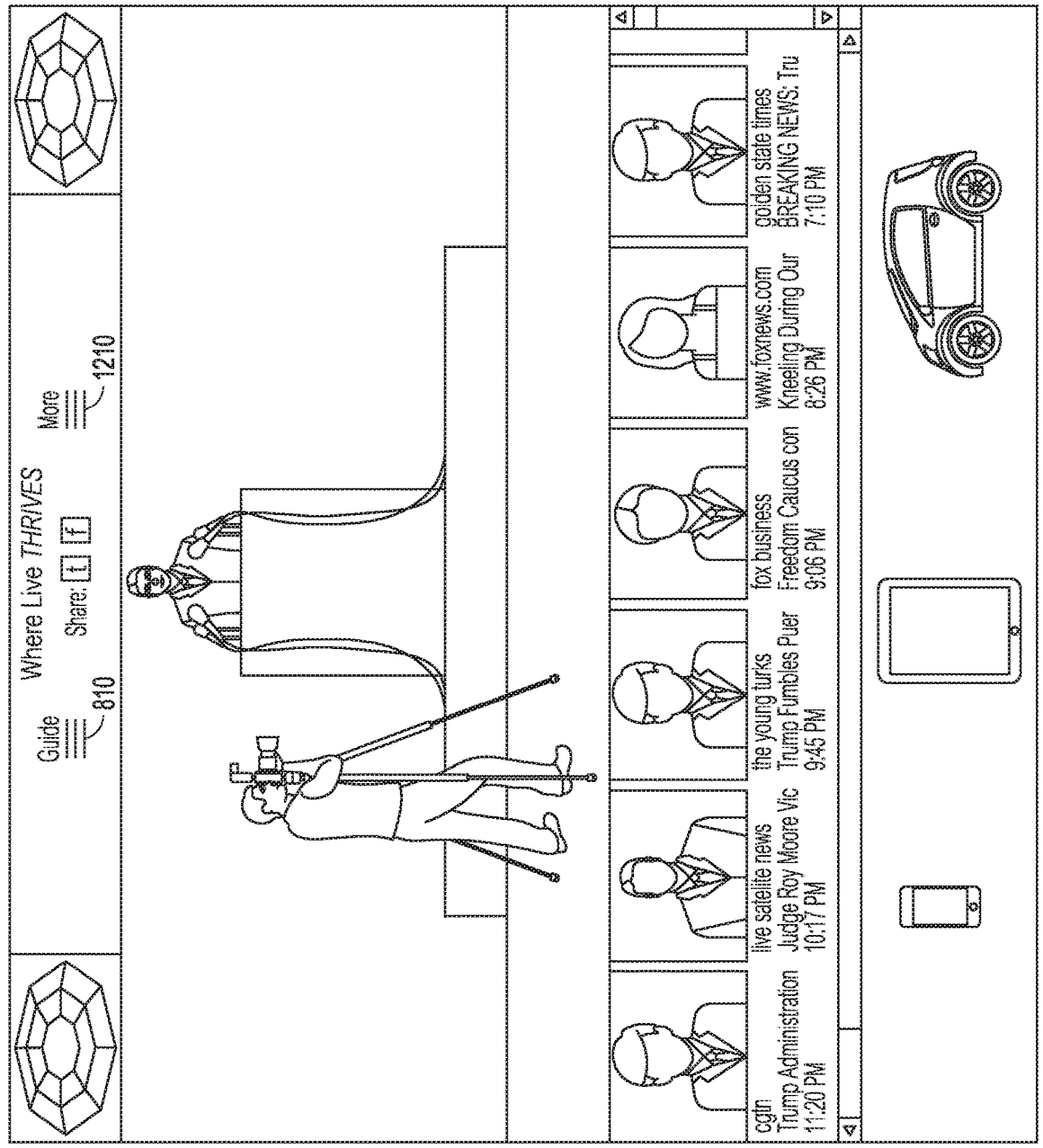
FIG. 12 is an example user live stream interface based on selecting a top-level menu word "Bloomberg" according to an example embodiment.

Clicking on "travel" in the nested menu 915, where top level menu words are represented with solid dots and nested menu items that are shown When a top-level menu word is selected are represented with hollow circles, results in the display shown in FIG. 11 at 1100, again with viewable content shown in the lower media available display portion. The streaming content displayed will be representative of items selected by an administrator or other means that is related to travel. FIG. 12 is a screen shot 1200 of results from selecting the news network "Trump", which result in current or live, VOD, and future content being shown related to Trump.

In one embodiment, a more button 1210 with three bars may include a link to a page that provides information about the service provided by the system, which currently includes links to pages which are labeled about broadcast, advertise, privacy, terms, and contact. This button may also be provided in FIGS. 10-11.

In further embodiments, one or more of the following list of features may be provided.

Bringing disparate live and current video, augmented reality (AR) overlay, virtual reality (VR), holographic or other streaming sources/technologies together into one common system. People previously had to go to separate systems (YouTube, UStream, twitch, etc.) to view the content presented there, thus missing or not finding content they wanted if they were viewing on the wrong system.

In various embodiments, AR provides a virtual overlay to a user's current reality where the overlay may include computer generated information, such as icons, textual information, and sounds that augment the user's experience while being at a physical location. VR provides an immersion of a user into an entirely or nearly entire virtual experience and environment which includes interactions with both computer generated and human objects. CR, or contextual reality, involves the presentation or recreation of a live event for a remote user, separated by place or time that allows the end-user to experience the source event in as close to a complete context or in an augmented context as the original event. The system 100 provides a CR experience.

The system provides live and near-live video from a variety of publicly available streaming silos (such as YouTube and UStream) and organizes them by topic and indexes their descriptions in a private database so that users can access all of the curated video/AR/VR in one space. For instance, YouTube, UStream and Twitch may each have multiple live streams of different interviews and analysis of Blizzard Entertainment's new product offering. A user on YouTube would only be able to find and watch the YouTube live interview on the YouTube system. The system allows the user to alternatively 1) search for 'Blizzard' or 2) look under Life-<Entertainment->Gaming, to get all of the current live/current video/AR/VR on the topic. Google in contrast does not focus on live and current video and makes no distinction as to if the video is current or live. Nor does Google currently search and index live/current AR/VR.

Current search engines search only periodically to update their search indexes and do not focus on the delivery of 'live/current' nature of streaming. Current search engines are not optimized for 'live/current' content. The system has a process to 'follow' various channels on the public streaming sites and whenever a new live/current stream or video is released, the system is notified and the content indexed into a system database. Further, that content is indexed by topic and the words of the description are indexed at the time the video information is downloaded.

Following live broadcasters may be done via social media notifications, email, or other means of identifying live content. The system may push the content up and make the content searchable by category and keywords. For instance, a football game may be identified by the team names, states, conference, coaches, players, or other information relevant to the game. Such information may be made available via, the notifications, email, or other means of identifying the content, including whether the content will be or is currently being streamed live.

Bringing in a wide variety of media that are directly relevant to the video/AR/VR stream at the time the stream is being watched to enhance the value of the viewing experience and not detract from it. People previously didn't have a direct and immediate way to be served a wide variety of directly related media content that might be contained in a wide variety of formats. If broadcasters wanted them to have that content they'd have to serve it up to the viewer in suboptimal ways that detract from the viewing experience. The system provides display of contextual media icons/images that float around and in various parts of the system as an overlay. The icons/images are 'clickable' objects that the user interacts with. The objects icons are portals/entry-points to a more in-depth layering of elements specific to that object. I.e., an object might be an icon of a university seal. By clicking on a specific object, a user drills down into that object, being taken to a more in-depth interaction with that object. In the example of the university seal for instance, the user (who is watching a live Syracuse Field Hockey game, may drill down into a pitch video and sign up form from the Syracuse Athletic director to sign up for a recruitment camp without being taken away from the game. The media may be anything from another VR overlay, a form, a video or a simple image file .jpg, .PDF or audio.

Curating a single topic across multiple video streaming sources/technologies so people can search on one specific topic in one specific place. Previously there was no way of searching for video content across disparate video streaming sources so people would have to go to each source and independently search for the content they wanted. The system indexes words and performs topic cataloging for incoming video/AR/VR stream information.

There is no single source for finding LIVE ONLY content across the internet. People previously had no single source they could go to to find out what is being broadcast LIVE right now in certain segments of the internet. The system receives notifications of live content and a user can request to see what content is currently being streamed live as shown in FIG. 9.

Delivering an immersive simulacrum alternative to actually being physically at an event. Video, AR and even VR on their own do not offer a rich enough environment to immerse the viewer into the experience of the event. Video, AR and VR are increasingly immersive experiences, but they do not contain the contextual clues that a live environment include like conversation, interpersonal dialog, smell, nuances, sounds, and directional sound. Other sensory elements like social cues, feelings, touch, smell, 'vibe' are imparted by the surround of animate and inanimate objects such people, the weather, wind, air and the ground you are standing on impart other layers of environment that are missing from the live environment. The system surrounds the video, AR or VR with elemental cues that create a simulacrum of the live experience that bring the viewer closer to the live environment, and draw him/her into a more immersive experience. Surrounding the viewing experience with environmental cues adds to the contextual depth, sensory breadth, and environmental immersion of viewing experience.

Live experiences will increasingly encompass the live component and multiple 'projected' versions of the live experience in different formats such as video/AR/VR/Contextual Reality and in multiple simultaneous but different viewing environments such 'VR' glasses, mobile phones, micro projectors, tv's, PC's in 2d, 3d, holographic, sensory immersion, in small/personal viewing settings and club or large stadium viewing, public area projection, network wide experience viewing on the macro/mass consumer end. The system can surround large venue viewing with the same 'context portal' media as the micro/personal experience. In a large group setting the system may allow the individual viewer/user to interact with context portal elements on an interpersonal basis with AR mobile access overlay of the media/context boxes even while in large public settings for instance.

The interaction with personalized AR enhances and enables the simulated live experience. The system provides a personalized interaction with a context portal.

Figure 13:
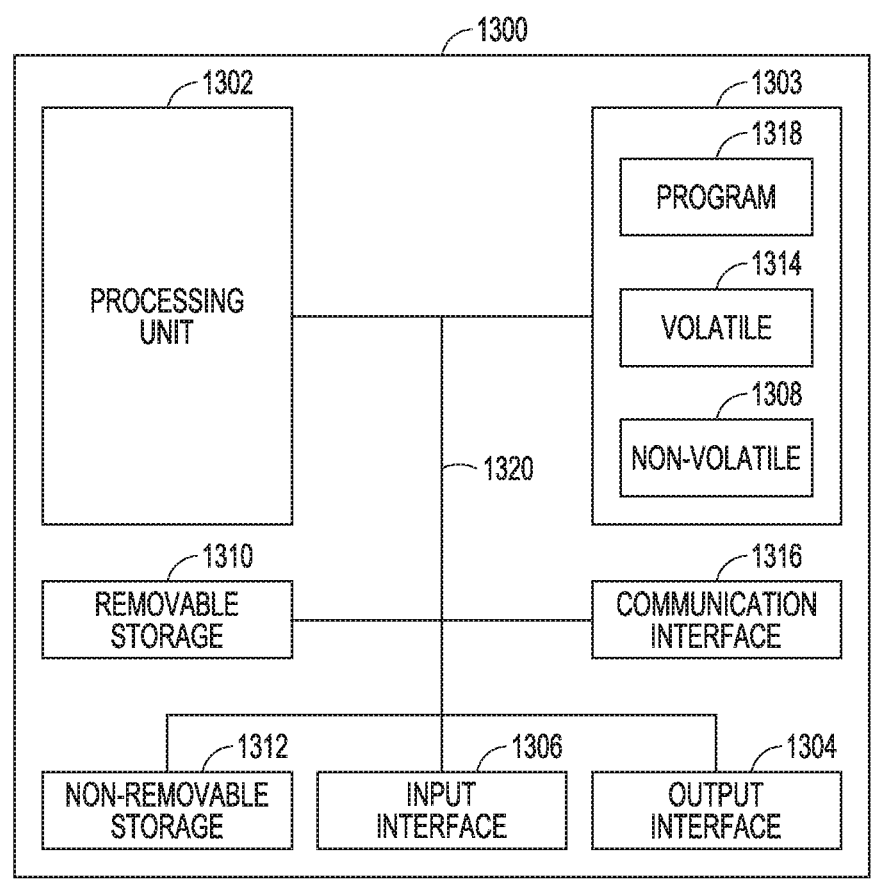
FIG. 13 is a block diagram of processing resources for use in performing one or more methods according to example embodiments.

FIG. 13 is a block diagram illustrating circuitry for implementing one or more of the stream enabled devices, resources for creating media box assets, event servers, and viewer devices and performing methods and streaming media/content according to example embodiments. All components need not be used in various embodiments.

One example computing device in the form of a computer 1300 may include a processing unit 1302, memory 1303, removable storage 1310, and non-removable storage 1312. Although the example computing device is illustrated and described as computer 1300, the computing device may be in different forms in different embodiments and may include quantum-based or organic based processing, communications, and storage resources and assets. For example, the computing device may instead be a smartphone, a tablet, smartwatch, or other computing device including the same or similar elements as illustrated and described with regard to FIG. 13. Devices, such as smartphones, tablets, and smartwatches, are generally collectively referred to as mobile devices or user equipment. Further, although the various data storage elements are illustrated as part of the computer 1300, the storage may also or alternatively include cloud-based storage accessible via a network, such as the Internet or server-based storage.

Memory 1303 may include volatile memory 1314 and non-volatile memory 1308. Computer 1300 may include— or have access to a computing environment that includes—a variety of computer-readable media, such as volatile memory 1314 and non-volatile memory 1308, removable storage 1310 and non-removable storage 1312. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1300 may include or have access to a computing environment that includes input interface 1306, output interface 1304, and a communication interface 1316. Output interface 1304 may include a display device, such as a touchscreen, that also may serve as an input device. The input interface 1306 may include one or more of a touchscreen, touchpad, mouse, keyboard, camera, one or more device-specific buttons, one or more sensors integrated within or coupled via wired or wireless data connections to the computer 1300, and other input devices. The computer may operate in a networked environment using a communication connection to connect to one or more remote computers, such as database servers. The remote computer may include a personal computer (PC), server, router, network PC, a peer device or other common DFD network switch, or the like.

The communication connection may include a Local Area Network (LAN), a Wide Area Network (WAN), cellular, WiFi, Bluetooth, quantum communication system or other networks. Or something which may be developed in the future) According to one embodiment, the various components of computer 1300 are connected with a system bus 1320. Computer-readable instructions stored on a computer-readable medium are executable by the processing unit 1302 of the computer 1300, such as a program 1318. The program 1318 in some embodiments comprises software that, when executed by the processing unit 1302, performs network switch operations according to any of the embodiments included herein.

A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1318 may be used to cause processing unit 1302 to perform one or more methods or algorithms described herein.

Various embodiments may include one or more of the following features or technical advantages. An administrator of system 100, referred to sometimes as a broadcaster, may control a viewer's background by broadcast or grouping of broadcasts (referred to as a channel). The broadcaster may also control which past broadcasts are presented on a channel. Past broadcasts may be presented as a ribbon, ticker or grouping of viewer selectable thumbnails.

Presentation of multiple live streams on a single 'page' or viewing area may be provided to expand the viewer's access to information and/or enhance contextual understanding/grasp of a subject.

Live content and VOD streams may be defined and presented as stand-alone or art of a channel at any time.

User or broadcaster may control context box size, shape and location.

Mobile app initiation of live stream and creation/manipulation of media boxes and context portals may be provided.

Broadcaster preferences such as background, media box and context portal content as they relate to a channel or a specific broadcast may be provided and used to control views of the streaming.

Ability to automatically move VOD files and media box and context portal content across disparate systems (i.e. from initial stream engine to third party storage facility).

Ability to quickly and easily integrate third party applications into the viewing environment by giving the Producer the ability to include in a Context Portal, the ability to take a viewer to a third party application for reference and/or use.

In one embodiment, viewing is a broad term including physical observation, machine-to-body interface and immersion, direct to optic nerve/Retina/eye image injections/casting/projection, or other forms of transmission and reception of the event/data/information/sense to the body's traditionally thought of senses (ie.: eye, ear, nose, touch, taste, 'other senses', etc.), and other body senses which are non-traditional but currently being explored by science. Viewing may include interaction with not only the information the viewer experiences directly but also with adjunct, third party, human and non-human assets, devices, simulations, programs, objects and machine or bio entities which are part of the context. Viewing will include all inputs and interactions needed for the sense immersion of the viewer to experience the event as if they were there and possibly extend the interaction with the event in ways that would exceed the experience beyond that of actually being there physically.

EXAMPLES

A method includes receiving a video stream from a camera at an event, receiving a media asset associated with the event, wherein the media asset is interactive, entertaining, informative and/or contextual, combining the video stream and media asset, rendering an augmented combined video and media asset stream, and transmitting the rendered augmented combined video and media asset stream to one or more viewer devices such that the video stream and media assets are displayed on a viewer device display screen.

The method of example 1 wherein the augmented combined video and media asset stream is rendered and transmitted by streaming contemporaneously with the event.

The method of any of examples 1-2 wherein the augmented combined video and media asset stream is rendered and transmitted via video on demand following the event.

The method of any of examples 1-3 wherein the media asset comprises multiple media assets.

The method of example 4 wherein at least one media asset is not interactive.

The method of any of examples 4-5 wherein the rendered stream is displayed with the video stream in a center portion of the viewer device display screen with the media assets displayed around an outside of the center portion.

The method of any of examples 4-6 wherein the rendered stream is displayed with the video stream in a selected portion of the viewer device display screen.

The method of example 7 wherein at least one media asset is displayed at least partially within the selected portion of the viewer device display screen.

The method of any of examples 1-8 wherein the media asset comprises an image and a link.

The method of example 9 wherein the link is selectable via the viewer device to provide a stack of selectable content.

The method of any of examples 1-10 wherein the media asset comprises a context asset.

A machine-readable storage device having instructions for execution by a processor of the machine to execute operations to perform a method including receiving a video stream from a camera at an event, receiving a media asset associated with the event, wherein the media asset is interactive, combining the video stream and media asset, rendering an augmented combined video and media asset stream, and transmitting the rendered augmented combined video and media asset stream to one or more viewer devices such that the video stream and media assets are displayed on a viewer device display screen.

The machine-readable storage device of example 11 wherein the augmented combined video and media/context asset stream is rendered and transmitted contemporaneously with the event.

The machine-readable storage device of any of examples 11-12 wherein the augmented combined video and media/context portal stream is rendered and transmitted via video on demand following the event.

The machine-readable storage device of any of examples 11-13 wherein the media/context asset comprises multiple media assets.

The machine-readable storage device of example 14 wherein at least one media asset is not interactive.

The machine-readable storage device of any of examples 14-15 wherein the rendered stream is displayed with the video stream in a center portion of the viewer device display screen with the media/context assets displayed around an outside of the center portion.

The machine-readable storage device of any of examples 14-16 wherein the rendered stream is displayed with the video stream in a selected portion of the viewer device display screen.

The machine-readable storage device of example 17 wherein at least one media/context asset is displayed at least partially within the selected portion of the viewer device display screen, The machine-readable storage device of any of examples 11-18 wherein the media/context asset comprises an image and a link, and wherein the link is selectable via the viewer device to provide a stack of selectable content.

A method including receiving a video stream from a camera at an event, receiving a media asset associated with the event, wherein the media asset is interactive, combining the video stream and media asset, rendering an augmented combined video and media asset stream, and streaming, via an event server, the rendered augmented combined video and media asset stream to one or more viewer devices such that the video stream and media assets are displayed on a viewer device display screen.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
receiving an encoded video stream from a camera at an event;
receiving a media asset associated with the event from a production facility, wherein the media asset is interactive and contextual and includes at least one selectable link;
receiving event programming instructions;
combining and rendering the video stream and media asset as an interactive web page at an event server in accordance with the event programming instructions into a rendered augmented combined video and media asset stream that includes the video stream and a separate media portal that includes the media asset; and
transmitting the rendered augmented combined video and media asset stream from the event server via a network to one or more viewer devices such that the video stream and media assets are displayed at a same time in separate portions of a viewer device display screen in the interactive web page such that the media asset remains interactive for interaction with an end consumer.

2. The method of claim 1 wherein the augmented combined video and media asset stream is rendered and transmitted by streaming contemporaneously with the event.

3. The method of claim 1 wherein the augmented combined video and media asset stream is rendered and transmitted via video on demand following the event.

4. The method of claim 1 wherein the media asset comprises multiple media assets and wherein the event programming instructions specify a location within the interactive web page for each media asset.

5. The method of claim 4 wherein at least one media asset is interactive in its separate portion of the viewer device display screen.

6. The method of claim 4 wherein the rendered stream is displayed with the video stream in a center portion of the viewer device display screen with the media assets displayed around an outside of the center portion.

7. The method of claim 4 wherein the rendered stream is displayed with the video stream in a selected portion of the viewer device display screen.

8. The method of claim 7 wherein at least one media asset is displayed at least partially within the selected portion of the viewer device display screen.

9. The method of claim 1 wherein the media asset comprises an image and a link.

10. The method of claim 9 wherein the link is selectable via the viewer device to provide a stack of selectable content.

11. The method of claim 1 wherein the media asset comprises a context asset.

12. A machine-readable storage device having instructions for execution by a processor of a machine to execute operations to perform a method comprising:
    receiving an encoded video stream from a camera at an event;
    receiving a media asset associated with the event from a production facility, wherein the media asset is interactive and contextual and includes at least one selectable link;
    receiving event programming instructions;
    combining and rendering the video stream and media asset as an interactive web page at an event server in accordance with the event programming instructions into a rendered augmented combined video and media asset stream that includes the video stream and a separate media portal that includes the media asset; and
    transmitting the rendered augmented combined video and media asset stream from the event server via a network to one or more viewer devices such that the video stream and media assets are displayed at a same time in separate portions of a viewer device display screen in the interactive web page such that the media asset remains interactive for interaction with an end consumer.

13. The machine-readable storage device of claim 12 wherein the augmented combined video and media stream is rendered and transmitted via video on demand following the event.

14. The machine-readable storage device of claim 12 wherein the media asset comprises multiple media assets.

15. The machine-readable storage device of claim 14 wherein at least one media asset is not interactive.

16. The machine-readable storage device of claim 14 wherein the rendered stream is displayed with the video stream in a center portion of the viewer device display screen with the media assets displayed around an outside of the center portion.

17. The machine-readable storage device of claim 14 wherein the rendered stream is displayed with the video stream in a selected portion of the viewer device display screen.

18. The machine-readable storage device of claim 17 wherein at least one media/context asset is displayed at least partially within the selected portion of the viewer device display screen.

19. The machine-readable storage device of claim 12 wherein the media asset comprises an image and a link, and wherein the link is selectable via the viewer device to provide a stack of selectable content.

20. A method comprising:
    receiving an encoded video stream from a camera at an event;
    receiving a media asset associated with the event from a production facility, wherein the media asset is interactive and contextual and includes at least one selectable link;
    receiving event programming instructions;
    combining and rendering the video stream and media asset as an interactive web page at an event server in accordance with the event programming instructions into a rendered augmented combined video and media asset stream that includes the video stream and a separate media portal that includes the media asset; and
    transmitting the rendered augmented combined video and media asset stream from the event server via a network to one or more viewer devices such that the video stream and media assets are displayed at a same time in separate portions of a viewer device display screen in the interactive web page such that the media asset remains interactive for interaction with an end consumer.

21. The method of claim 1, wherein the interactive web page includes at least one of a viewer added asset.

22. The machine-readable storage device of claim 12 wherein the interactive web page includes at least one of a viewer added asset.

23. The method of claim 20, wherein the interactive web page includes at least one of a viewer added asset.

24. The method of claim 4, wherein the augmented combined video remains viewable during interaction with the multiple media assets being displayed in an interactive portion of the web page.

25. The machine-readable storage device of claim 12 wherein the augmented combined video remains viewable during interaction with the media assets being displayed in an interactive portion of the web page.

26. The method of claim 20, wherein the augmented combined video remains viewable during interaction with the media assets being displayed in an interactive portion of the web page.

* * * * *